United States Patent
Sanders et al.

(10) Patent No.: US 10,451,421 B2
(45) Date of Patent: Oct. 22, 2019

(54) RESONANT FIBER OPTICAL GYROSCOPE USING ANTIRESONANT NODELESS FIBER

(71) Applicant: Honeywell International Inc., Morris Plains, NJ (US)

(72) Inventors: Glen A. Sanders, Scottsdale, AZ (US); Clarence Eugene Laskoskie, Scottsdale, AZ (US); Chellappan Narayanan, Phoenix, AZ (US); Lee K. Strandjord, Tonka Bay, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/952,971

(22) Filed: Apr. 13, 2018

(65) Prior Publication Data
US 2019/0212148 A1 Jul. 11, 2019

Related U.S. Application Data

(60) Provisional application No. 62/613,918, filed on Jan. 5, 2018.

(51) Int. Cl.
*G01C 19/72* (2006.01)
*F21V 8/00* (2006.01)

(52) U.S. Cl.
CPC ......... *G01C 19/722* (2013.01); *G01C 19/727* (2013.01); *G02B 6/0096* (2013.01)

(58) Field of Classification Search
CPC ... G01C 19/722; G01C 19/727; G02B 6/0096
See application file for complete search history.

(56) References Cited

U.S. PATENT DOCUMENTS

| | | | |
|---|---|---|---|
| 6,539,155 B1 * | 3/2003 | Broeng | B29D 11/00721 385/125 |
| 7,327,460 B2 | 2/2008 | Sanders et al. | |
| 7,372,574 B2 | 5/2008 | Sanders et al. | |
| 7,463,360 B2 | 12/2008 | Hughes et al. | |
| 7,522,284 B2 | 4/2009 | Sanders et al. | |
| 7,619,743 B2 | 11/2009 | Digonnet et al. | |

(Continued)

FOREIGN PATENT DOCUMENTS

| | | |
|---|---|---|
| EP | 0434767 A1 | 7/1991 |
| EP | 3249432 A1 | 11/2017 |

OTHER PUBLICATIONS

Belardi et al., Hollow antiresonant fibers with reduced attenuation, Mar. 21, 2014, Optics Letters, vol. 39, No. 7, pp. 1853-1856 (Year: 2014).*

(Continued)

*Primary Examiner* — Michael P. LaPage
(74) *Attorney, Agent, or Firm* — Fogg & Powers LLC (57) ABSTRACT

An optical resonator is provided. The optical resonator comprises: an optical resonator coil comprising a first port and a second port; wherein the optical resonator coil comprises antiresonant nodeless fiber; a resonator loop closure optics system; and wherein the antiresonant nodeless fiber has a length such that the resonant frequencies the optical resonator of the desired polarization state of light and of the undesired polarization state of light are separated by between a tenth of a free spectral range and nine tenths of a free spectral range to minimize gyroscope errors.

20 Claims, 4 Drawing Sheets

(56) References Cited

U.S. PATENT DOCUMENTS

| | | |
|---|---|---|
| 7,697,143 B2 | 4/2010 | Sanders et al. |
| 7,751,055 B2 | 7/2010 | Sanders et al. |
| 7,844,152 B2 | 11/2010 | Sanders |
| 7,911,620 B2 | 3/2011 | Digonnet et al. |
| 8,098,380 B2 | 1/2012 | Sanders et al. |
| 8,427,651 B2 | 4/2013 | Digonnet |
| 9,158,065 B2 | 10/2015 | Fini |
| 2004/0263856 A1* | 12/2004 | Willig ............... G01C 19/721 356/460 |
| 2005/0232560 A1* | 10/2005 | Knight ............... C03B 37/0122 385/125 |
| 2008/0180681 A1* | 7/2008 | Digonnet ............. G01C 19/722 356/477 |
| 2010/0128277 A1 | 5/2010 | Qiu et al. |
| 2011/0134432 A1 | 6/2011 | Terrel et al. |
| 2011/0141477 A1 | 6/2011 | Sanders et al. |
| 2012/0062902 A1 | 3/2012 | Digonnet |
| 2012/0307251 A1 | 12/2012 | Sanders et al. |
| 2013/0070252 A1 | 3/2013 | Feth |
| 2015/0260520 A1 | 9/2015 | Qiu et al. |
| 2015/0369606 A1 | 12/2015 | Sanders et al. |
| 2018/0347986 A1* | 12/2018 | Kim ..................... G01C 19/722 |

OTHER PUBLICATIONS

Meng et al., "Low Loss Hollow-Core Antiresonant Fiber With Nested Elliptical Cladding Elements", Photonics Journal IEEE, vol. 10, pp. 1-12, Dec. 2016.

Mousavi et al., "First Design of High Birefringence and Polarising Hollow Core Anti-resonant Fibre", 2015 European Conference on Optical Communication (ECOC), Date of Conference: Sep. 27-Oct. 1, 2015, pp. 1-3, Publisher: IEEE.

Poletti, "Nested antiresonant nodeless hollow core fiber", 2014 Optical Society of America, published Sep. 22, 2014, pp. 1-22.

European Patent Office, "Extended EP Search Report from EP Application No. 18020576.7 dated May 31, 2019", "From Foreign Counterpart of U.S. Appl. No. 15/952,971", pp. 1-10, Published in EP.

Jiao et al. "Analysis of polarization noise in transmissive single-beam-splitter resonator optic gyro based on hollow-core photonic-crystal fiber", Optics Express; vol. 25, No. 22; Oct. 30, 2017; pp. 27806-27817.

* cited by examiner

RESONANT FIBER OPTICAL GYROSCOPE USING ANTIRESONANT NODELESS FIBER

CROSS-REFERENCE TO RELATED APPLICATIONS

This application claims benefit of U.S. Provisional Application Ser. No. 62/613,918, filed Jan. 5, 2018, and titled "HOLLOW CORE RESONANT FIBER OPTICAL GYROSCOPE," which is incorporated herein by reference in it entirety.

STATEMENT REGARDING FEDERALLY SPONSORED RESEARCH OR DEVELOPMENT

This invention was made with Government support under Government Contract Number Ordnance Technology Base Agreement No. 2016-316, Ordnance Agreement No. 1 and 2 awarded by DOTC. The Government has certain rights in this invention.

BACKGROUND OF THE INVENTION

Gyroscopes are used to measure rotation rates or changes in angular velocity about an axis. A resonant fiber optic gyroscope (RFOG) includes a light source, a beam generating device, and an optical fiber coil coupled to the beam generating device. The beam generating device transmits light beams into the coil that propagate in a clockwise (CW) direction and a counter-clockwise (CCW) direction along the core of the optical fiber. Many RFOGs utilize glass-based optical fibers that conduct light along a solid core of the fiber. The two counter-propagating (CW and CCW) light beams experience different path lengths while propagating around a rotating path, and the difference in the two path lengths is proportional to a rate of rotation around the gyroscope's axis.

In general, the size of the RFOG affects the accuracy or sensitivity of a RFOG. For example, smaller RFOGs typically have less accuracy than larger RFOGs. RFOGs have accuracies that generally increase with the diameter of the light path formed by the optical fiber coil, and traversed by the light beams. Thus, the larger the coil diameter—the greater the signal-to-noise ratio of the RFOG. Also, to improve the signal-to-noise ratio of the RFOG, the optical path may be increased by increasing the number of turns of the optical fiber coil.

In a resonant fiber optic gyro, the optical fiber coil acts as a resonator. The counter-propagating light beams in the optical fiber coil are monochromatic. The counter-propagating light beams circulate through multiple turns of the optical fiber coil, and recirculate multiple times through the optical fiber coil using a recirculating device such as an optical fiber coupler or a beam splitter. The recirculating device also introduces light into and extracts light out of, the optical resonator. The beam generating device typically modulates and/or shifts the frequencies of each of the counter-propagating light beams so that the resonant frequencies of the resonator formed by the resonator coil and the recirculating device may be observed. The resonant frequencies for each of the CW and CCW paths through the optical fiber coil are based on a constructive interference of successively recirculated beams in each optical path. A rotation rate around the axis of the RFOG, i.e. the optical fiber coil's center axis, produces a shift in the resonant frequencies of the CW and CCW paths through the optical fiber coil. The frequency difference associated with tuning the CW beam and CCW beam frequencies to match the optical fiber coil's resonant frequency shifts in the counter-propagating paths due to rotation is indicative the RFOG's rotation rate.

RFOGs are susceptible to bias error due to polarization cross-coupling. Light may be cross-coupled between two polarization states in the fiber coil itself. The second, undesired polarization state may resonate and produce an asymmetry in the resonance line shape of the first, desired polarization state used to measure a rotation. Even though, ignoring other spurious affects, the resonant frequencies of the first and second polarization states are the same for each of the CW and CCW paths, the excitation levels of the resonances for each polarization state may differ between CW and CCW directions, due to different launching conditions. In addition, the detection of light from the resonator in the two polarization states may differ between CW and CCW directions. These conditions result in polarization-induced bias error which can severely limit the accuracy of the RFOG because determination of the resonance centers for each of the resonant frequencies of the CW and CCW paths directly affects the rotational rate measurement. To reduce polarization induced bias error due, RFOG optical fiber coils are conventionally fabricated with highly birefringent optical fiber which supports two polarization states, but is much less susceptible to cross coupling between those modes.

In the RFOG, bias error is caused by the presence of glass material, through which light beams travel, in the optical fiber of the optical fiber coil. The refractive index of the glass material is non-linear with respect to the power of the light beam due to the Kerr effect. If the powers of the CW and CCW light beams differ, so will the refractive index of the corresponding glass material in the CW and CCW paths. This results in a non-reciprocal path length of the RFOG resonator, and an erroneous determined rate of rotation. The glass material gives rise to other spurious effects, such as stimulated Brillouin scattering and a Faraday magneto-optical effect, which also cause bias error.

Problems with solid core fibers are discussed further in U.S. Pat. No. 7,751,055 (hereinafter the "'055 Patent") which is hereby incorporated by reference herein in its entirety. The '055 Patent discloses solving this problem by using an optical fiber coil made from hollow core optical fiber coil. One hollow core optical fiber disclosed in the '055 Patent is a hollow core bandgap fiber.

Hollow core bandgap fiber, otherwise known as photonic bandgap fiber, is formed by a lattice of glass rods. The lattice of cells forms a region around a hollow core and the core wall of the hollow core; light substantially propagates through the hollow core. The lattice of cells surrounding the hollow core is referred to as the cladding region. Each cell, in the lattice or cladding region, has a glass wall which is referred to here as a strut or a membrane.

Inside the membranes of each cell is free space (not glass), e.g. which may be either vacuum or gas-filled. Gas is defined herein to mean a state of matter between plasma and liquid of:

at least one type of single element (e.g. neon), at least one type of elemental molecule (oxygen), at least one type of compound molecule (e.g. carbon dioxide), or a mixture of one or more of the foregoing (e.g. air).

Gas, as used herein, also means dry gas and gas that is not dry. A dry gas includes no vapor that liquefies at an ambient temperature and pressure. Whereas natural air is an example of a gas that is not dry, dry air is an example of a gas that is dry.

Two adjacent cells share a membrane as a wall; however, where more than two cells meet, a node is formed. The node typically is at the intersection between three membranes.

The walls of some cells along one axis within the cladding may be thicker than others to cause the hollow core bandgap fiber to be highly birefringent, and thus, inhibit optical cross-talk between polarization states within the fiber. Although it eliminates the problematic core of glass material, hollow core bandgap fiber is not without its own problems.

Features within a hollow core bandgap fiber such as the nodes, or imperfections in launching into the hollow core bandgap fiber, cause light propagation in undesirable surface modes; light in surface modes travels in a collection of cells surrounding the core, rather than in the hollow core. Perturbations in the hollow core bandgap fiber later couple the light in surface modes back into the core. Surface modes can create bias error and noise due to back scattering of light in the surface modes and due to surface roughness, as well as multipath effects arising from cross-coupling between light in the surface modes and the core. Therefore there is a need for an RFOG with a hollow core fiber that does not suffer from these bias errors and noise mechanisms.

BRIEF SUMMARY OF THE INVENTION

An optical resonator is provided. The optical resonator comprises: an optical resonator coil comprising a first port and a second port; wherein the optical resonator coil comprises antiresonant nodeless fiber; a resonator loop closure optics system; and wherein the antiresonant nodeless fiber has a length such that the resonant frequencies the optical resonator of the desired polarization state of light and of the undesired polarization state of light are separated by between a tenth of a free spectral range and nine tenths of a free spectral range to minimize gyroscope errors.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A resonant fiber optic gyroscope (RFOG) with an optical fiber coil made from antiresonant nodeless fiber, which has a hollow core, may be used to overcome the aforementioned problems. Antiresonant nodeless fiber includes antiresonant nodeless fibers which are nested and which are not nested.

Figure 1A:
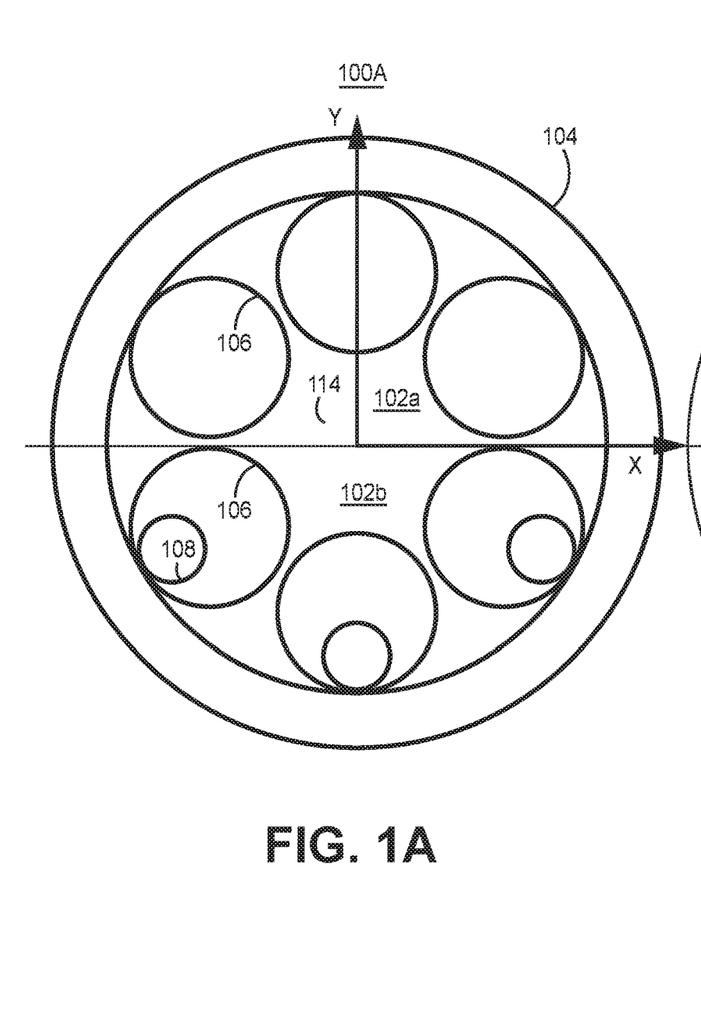
FIG. 1A illustrates cross sections of exemplary embodiments of antiresonant nodeless fiber.

Referring now to the drawings, FIG. 1A illustrates cross sections of exemplary embodiments of antiresonant nodeless fiber 100A. The cross-section of the antiresonant nodeless fiber comprises a central vacant region, or core, surrounded by a series of tubes, e.g. made from glass; however it is contemplated that other materials may be used. Although a circular cross section is illustrated for all of the tubes, the cross section of the tubes disclosed herein can have different shapes such as an elliptical cross section. The tubes may be filled with a vacuum or be gas (for example air).

Figure 1B:
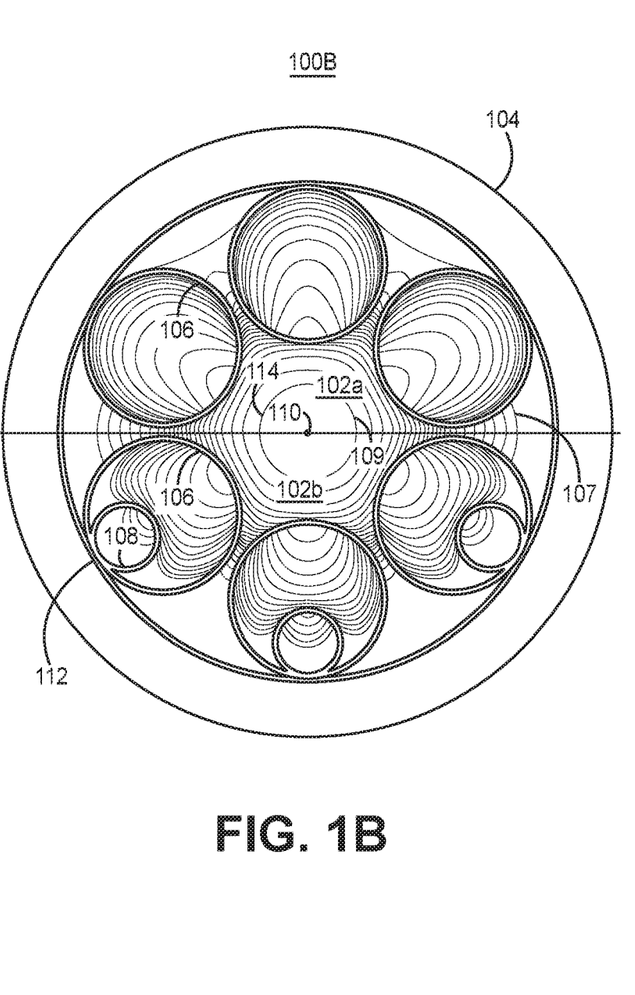
FIG. 1B illustrates the mode field, 3-dB power contours in cross sections of exemplary embodiments of antiresonant nodeless fiber.

The top portion of FIG. 1A illustrates one embodiment of an antiresonant nodeless fiber that is not nested 102a. The antiresonant nodeless fiber which is not nested 102a is formed by an outer tube 104 containing inner tubes 106. The bottom portion of FIG. 1A illustrates one embodiment of an antiresonant nodeless fiber that is nested 102b. The antiresonant nodeless fiber that is nested 102b differs from the antiresonant nodeless fiber that is not nested 102a by having at least one nested tube 108 within each inner tube 106. Additional nested tubes can be inserted within the first nested tube, and each successive nested tube. FIG. 1B illustrates a mode field with 3 dB power contours in cross sections of exemplary embodiments of antiresonant nodeless fiber 100B. The mode field shape is illustrated by plotting the 3 dB contour lines 107 of the mode. Between each 3 dB contour line the intensity of the mode diminishes by 3 dB, or by a factor of two. The innermost contour is nearly circular, showing a desirably circular mode-field distribution, with the peak intensity in the very center of the hollow core. At the innermost 3 dB contour 109, the intensity has dropped by 3 dB from the very center of the core. Dependent upon their design, the antiresonant nodeless fiber which is nested 102b and the antiresonant nodeless fiber which is not nested 102a concentrate light of certain frequencies in the center 110 of their hollow core regions.

Nesting, due to the Fabry Perot etalon or Bragg-like effects, beneficially causes more of the intensity of the light of certain frequencies to be concentrated in the center 110 of the hollow core region, increasing confinement of the light. This decreases optical loss. As shown in FIG. 1, the 3 dB contours move inward further for the nested case 102b, than that of the unnested case 102a. This shows greater confinement and less loss. It reduces light intensity near the outer part of each inner tube 106, and the larger outer tube 104. This in turn reduces loss at the boundary 112 between tubes 106, 108, and 104. Thus, more of the light propagates down the hollow core 114 of the antiresonant nodeless fiber which is nested 102b than the hollow core 114 of the antiresonant nodeless fiber which is not nested 102a. Thus, the antiresonant nodeless fiber which is nested 102b has lower insertion loss than the antiresonant nodeless fiber which is not nested 102a. The insertion loss of the antiresonant nodeless fiber which is nested 102b may be further reduced by adding additional nested tubes as described above.

Because the inner tubes 106 only connect with the outer tube 104 and not each other, no surface modes are created. This diminishes bias error and noise while maintaining the benefits of a hollow core fiber. Further, the antiresonant nodeless fiber which is nested 102b and the antiresonant nodeless fiber which is not nested 102a have less undesirable backscatter than hollow core bandgap fiber. By having no surface modes, no light energy from the fundamental mode guided in the core is coupled to other surrounding modes that the core may support.

The antiresonant nodeless fiber has a uniform propagation constant for light of various polarization states until bent, and a low birefringence. The birefringence of the antiresonant nodeless fiber is also substantially temperature invariant, i.e. stable over temperature. Using low birefringence optical fiber is counterintuitive for RFOG optical fiber coil. RFOG designs based on solid core have emphasized highly birefringent fiber so that, in the presence of perturbations, the fiber is resistant to polarization cross-coupling. However, because antiresonant nodeless fiber has so few defects and perturbations, there is greatly diminished cross-coupling between polarization states even without high birefringence.

However, if there is complete symmetry between polarizations, it is undesirable to use ultra-low birefringence antiresonant nodeless fiber in an RFOG optical fiber coil. In this limiting case, the index of refraction of antiresonant nodeless fiber is substantially the same in both polarization states, vertical and horizontal, and the optical path inside the fiber is virtually the same. This means that in a RFOG, resonances from the two polarization states, in this extreme case, will align with one another, i.e. fall exactly on top of each other, or fall very close to each other. This gives rise to bias errors in the RFOG because of the lack of inherent discrimination between the two polarization states as occurs in high birefringence fiber.

However, this problem can be redressed. When the antiresonant nodeless fiber is bent, e.g. to form a coil, the difference between the indices of refraction between the polarization states changes by a fixed amount. Beneficially, parameters, such as index of refraction, of the antiresonant nodeless fiber are temperature invariant unlike for other optical fiber types. Thus, the difference between the path lengths of the two polarization states is well defined and stable. As described below, this allows the optical resonator path length to be designed so that the resonant frequencies of the two polarization states will be offset. As a result, the RFOG can be fabricated to optimally discriminate between the two polarization states in each (CW and CCW) optical path.

Figure 2:
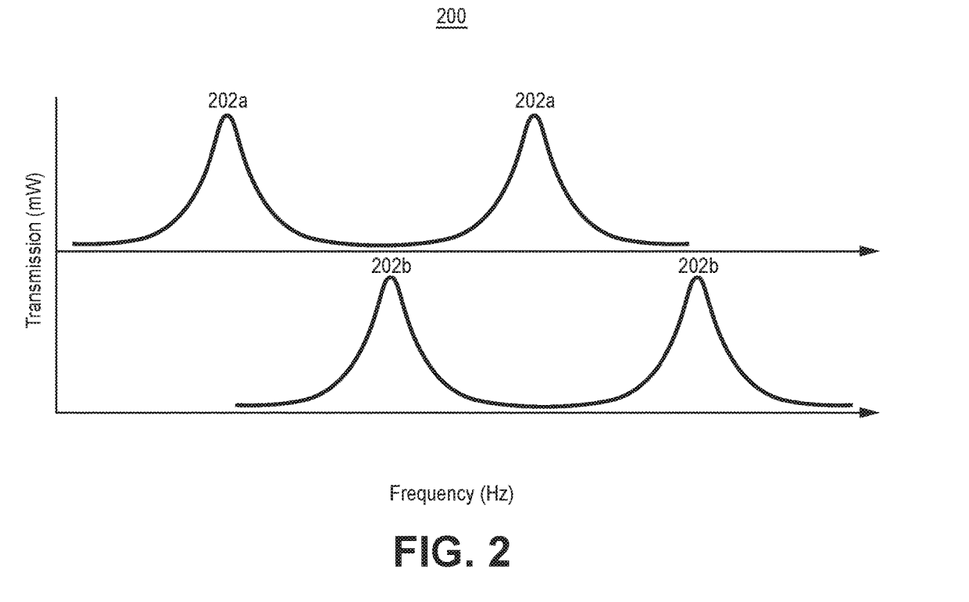
FIG. 2 illustrates a block diagram of one embodiment of an RFOG with an optical fiber coil made from antiresonant nodeless fiber.

FIG. 2 illustrates one embodiment of transmission characteristics of an optical resonator, including an optical resonator coil formed by antiresonant nodeless fiber, designed to have resonances, and thus resonant frequencies, of two polarization states that are offset through optical path length selection 200. The resonances 202a of an optical signal having a first polarization state is offset from the resonances 202b of an optical signal having a second polarization state. As will be further discussed, the resonant frequencies of the resonances of each polarization state are to be separated by between one tenth of a free spectral range and nine tenths of a free spectral range, e.g. between one quarter of a free spectral range and three quarters of a free spectral range or by one half of a free spectral range. This permits use of optical fiber that is not birefringent to be used in an RFOG while allowing the RFOG to discriminate between the signals of the two different polarization states. Unmodulated carriers, or sidebands of modulated carriers, corresponding to each polarization state are aligned with their respective resonances 202a, 202b. This is further discussed below.

Figure 3:
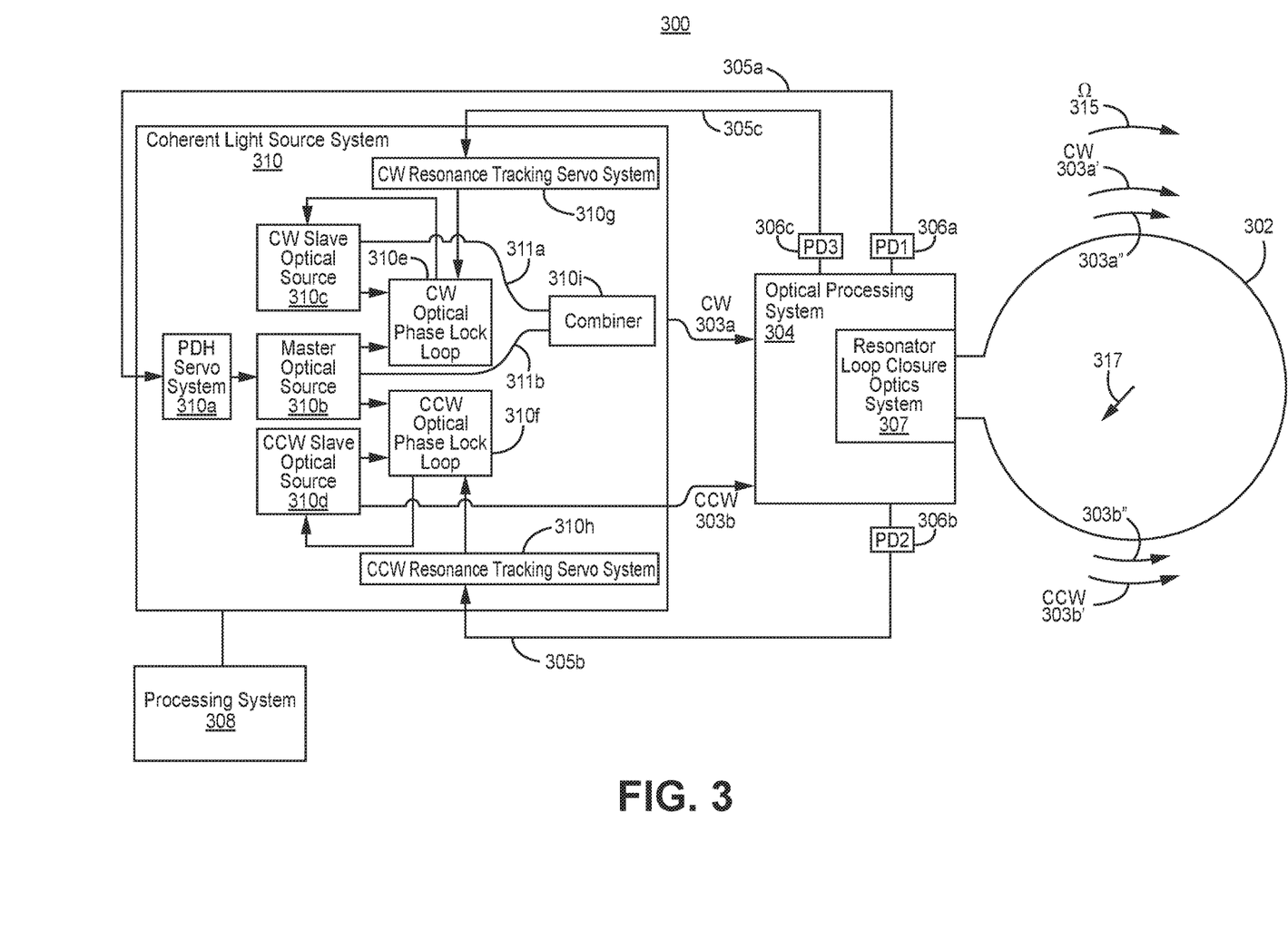
FIG. 3 illustrates a block diagram of one embodiment of an RFOG with an optical fiber coil made from antiresonant nodeless fiber.

FIG. 3 illustrates a block diagram of one embodiment of an RFOG with an optical fiber coil made from antiresonant nodeless fiber 300. The embodiment illustrated in FIG. 3 is but one RFOG architecture in which the present invention can be implemented.

In the illustrated embodiment, the RFOG with an optical fiber coil made from antiresonant nodeless fiber 300 includes an optical resonator coil 302, an optical processing system 304, a first photodetector (PD1) 306a, a second photodetector (PD2) 306b, a third photodetector (PD3) 306c, a coherent light source system 310, and a processing system 308. The optical resonator coil 302 is made from antiresonant nodeless fiber which has a hollow core. The antiresonant nodeless fiber may be nested or unnested. In one embodiment, the optical resonator coil 302 is comprised of turns or windings of the antiresonant nodeless fiber.

The optical resonator coil 302 is coupled to the optical processing system 304. The optical processing system 304 includes a resonator loop closure optics system 307. Optionally, the optical processing system 304 includes mirrors and collection optics (e.g. prisms) to implement optical output ports, and/or ball lenses to implement optical input ports. Optionally, the optical processing system 304 may also include polarizers to suppress undesired polarization states. Exemplary embodiments of optical processing systems 304 are illustrated in U.S. patent application Ser. No. 15/871, entitled Apparatus and Method for Diminished Bias Error Due to Polarization Mismatch, which was filed on Jan. 15, 2018 and is hereby incorporated by reference in its entirety. The optical resonator comprises the optical resonator coil 302 and the resonator loop closure optics system 307.

The first photodetector 306a, the second photodetector 306b, the third photodetector 306c, and the coherent light source system 310 are coupled to optical processing system 304.

Photodetectors convert incident optical signals into electrical signals. The amplitude of the electrical signal generated by a photodetector is linearly related to the intensity of the incident optical signal. Although three photodetectors are exemplified herein, other embodiments of the RFOG with an optical fiber coil made from antiresonant nodeless fiber may have four photodetectors, and the coherent light source system 310 would be alternatively implemented with two Pound-Drever-Hall (PDH) servo systems as illustrated, for example, in U.S. Pat. No. 8,947,671 which is incorporated by reference herein in its entirety. The optional fourth photodetector (PD4) is referenced by way of example elsewhere herein. However, in other embodiments of the RFOG the RFOG with an optical fiber coil made from antiresonant nodeless fiber 300 illustrated in FIG. 3, the optional fourth photodetector can be used for diagnostic purposes.

The processing system 308 is a state machine. In one embodiment, the processing system comprises processor circuitry coupled to memory circuitry. The processor circuitry comprises one or more microprocessors, digital signal processors, microcontrollers, application specific integrated circuits and/or gate arrays. The memory circuitry may comprises one or more of dynamic random access memory, Flash memory, read only memory, magnetic hard drives, and optical memory systems.

The processing system 308 determines the angular rate of rotation of the optical resonator coil 302 by processing signals from the coherent light source system 310. The memory circuitry includes program instructions which are executed by the processor circuitry to determine the angular rate of rotation 315 of the optical resonator coil 302 about an input axis 317.

The angular rate of rotation 315 is determined by the difference between the resonant frequencies of the optical resonator in the clockwise and counterclockwise directions. This is measured by locking the frequencies, $f_{cw}$ and $f_{ccw}$, of the clockwise (CW) slave optical signal (or first optical signal) 311a and the counter clockwise (CCW) slave optical signal (or second optical signal) 303b to the CW and CCW resonances, respectively, of the optical resonator comprising the optical resonator coil 302 and the resonator loop closure optics system 307. Thus, the processing system 308 uses a frequency difference, Δf, between the frequency, $f_{cw}$, of the CW slave optical signal and the frequency, $f_{ccw}$, of the CCW slave optical signal to derive the rotation rate output of the optical resonator, e.g. the RFOG with the RFOG with an optical fiber coil made from antiresonant nodeless fiber 300. The first optical signal 311a is combined to a master optical signal (or second optical signal) 311b in an optical combiner (combiner) 310i prior to being coupled to the optical processing system 304, and then to the optical resonator. The CCW slave optical signal 303b is also coupled to the optical processing system 304, and then the optical resonator. In another embodiment, signals representative of $f_{ccw}$ and $f_{cw}$ are respectively provided by a CCW resonance tracking servo system 310h and a CW resonance tracking servo system 310g in the coherent light source system 310. In a further embodiment, the angular rate of rotation 315 about the input axis 317 is an angular rate of rotation, Ω, 315 where $\Omega=(\lambda*\Delta f*P)/(4*A)$, λ is substantially equal to the average wavelength of the clockwise optical signal 303a and the counter-clockwise optical signal 303b. A is the area enclosed by the optical resonator coil 302 and P is the perimeter of the optical resonator path of the optical resonator coil 302 and resonator loop closure optics system 307.

The coherent light source system 310, or components therein, may include components not shown in FIG. 2. Such components may be used to amplitude and phase modulate optical signals, and to amplify or split optical signals. In one embodiment, such components include intensity modulator(s), phase modulator(s), optical amplifier(s), optical isolator(s), and optical passive device(s).

The coherent light source system 310 generates a clockwise (CW) optical signal 303a and counter-clockwise (CCW) optical signal 303b which are coupled to the optical resonator coil 302 by the optical processing system 304. In one embodiment, the CW optical signal 303a and the CCW optical signal 303b are linearly polarized. In another embodiment, the linearly polarized CW optical signal 303a and the linearly polarized CCW optical signal 303b are each substantially linearly polarized in one direction, e.g. horizontal or vertical, or P and S polarized. The direction of polarization is ideally the same for the linearly polarized CW optical signal 303a and the linearly polarized CCW optical signal 303b. Polarized CW optical signal 303a' and polarized CCW optical signal 303b' propagate respectively clockwise and counter-clockwise around the optical resonator coil 302. Because of imperfect launch conditions into the resonator from the optical processing system, a small amount of light may be launched into the resonator to excite the orthogonal polarization state to that traveling in the desired polarization (signal light) 303a' and 303b' in CW and CCW directions respectively. Light traveling in the unwanted, orthogonal state is represented as 303a" and 303b" in the CW and CCW directions, respectively. Light intensities in 303a" and 303b" may be different, and the degree to which each of the undesired polarizations interferes in the detection process may be different, each causing a rotation rate error without countermeasures described below. The degree to which 303a" and 303b" have different power levels inside the resonator may be due to the input optical signals 303a and 303b are not perfectly polarized as the desired polarization state in the resonator, called the desired polarization eigenstate of the resonator, in which of signal light inside the resonator 303a' and 303b' are traveling. The input optical signals may 303a and 303b may have a polarization component aligned with the undesired polarization eigenstate of the resonator denoted by 303a" and 303b". Even if the input optical signals 303a and 303b are perfectly aligned with the desired polarization of light in the resonator, cross-coupling of polarization in the optical processing system 304 may cause light to travel in undesired polarization states denoted by paths 303a" and 303b".

It is ideally desirable that the linearly polarized CW optical signal 303a and the linearly polarized CCW optical signal 303b are each completely linearly polarized in one direction; however, imperfect launch conditions make this this ideal condition impractical and small amounts of light capable of exciting the wrong polarization state may be introduced to the resonator. It is thus desirable to discriminate against the undesired polarization of each of such signals 303a" and 303b" that may travel within the resonator. Because the birefringence of the antiresonant nodeless fiber is low and stable, the optical resonator coil 302—and thus the optical resonator—the optical resonator, or one of its components such as the optical fiber coil 302, can be designed to shift the resonant frequency of the undesired polarization of each of the CW optical signal 303a" and the CCW optical signal 303b" away from the desired polarization of the polarized CW optical signal 303a' and polarized CCW optical signal 303b'. As a result, the undesired polarization state will not interfere with the desired polarization state; this further reduces bias error. The resonant frequencies of the optical resonator at each polarization in one path (CW or CCW) is:

X Polarization State: $n_x L = p\lambda$;

Y Polarization State: $n_y L = (p+q+k)\lambda$; and

Birefringence: $\Delta n = n_x - n_y$, where L is the path length of the optical resonator, λ, is the wavelength of the light at which the resonator is resonant given by the speed of light in vacuum, c, divided by the optical resonant frequency of the resonator, p and q are integer numbers further described below, k is a fraction less than one such as, 1/10, 1/4, 1/2, or 9/10, and Δn is the amount of birefringence. In further illustrations below, k is 1/2. In the illustrated example, the X polarization state is desired, and the Y polarization state is undesired. The value of k is selected so that the resonance of the undesired polarization state, Y polarization state, is sufficiently displaced in resonance wavelength (or resonance frequency) from the desired polarization state, X polarization state, to substantially reduce bias error induced by the undesired polarization state. The free spectral range of the resonator ("FSR") is given by $c/n_x L$ for the X-polarized light path, and $c/n_y L$ for the Y polarized light path.

To achieve the necessary discrimination between the two polarization states, and hence reduce bias error, the resonant frequencies of each polarization state of the optical resonator are separated by between one tenth of a free spectral range and nine tenths of a free spectral range, e.g. between one quarter of a free spectral range and three quarters of a free spectral range or by one half of a free spectral range. A major benefit of the antiresonant nodeless fiber is that the length scale necessary for trimming the optical fiber coil so that the two polarization paths have the necessary resonance frequencies difference is typically on the order of 1 cm to 50 cm, which is convenient in practice.

As further discussed below, the CW optical signal 303a and the CCW optical signal 303b may be frequency modulated, and a sideband, or sidebands, rather than the carrier signal may be detected and used to determine the resonant frequencies of the resonances in the CW and CCW paths. For such an implementation, the foregoing technique can also be used to shift the resonant frequency of the undesired polarization of the CW optical signal 303a'' and the CCW optical signal 303b'' away from the resonant frequencies of the desired polarization optical signals 303a' and 303b' in the CW and CCW directions, respectively.

The optical processing system 304 generates optical feedback signals which are converted to electrical feedback signals by the first photodetector 306a, the second photodetector 306b, and the third photodetector 306c. The first photodetector 306a, the second photodetector 306b, and the third photodetector 306c respectively generate a first feedback signal 305a, a second feedback signal 305b, and a third feedback signal 305c which are coupled to the coherent light source system 310.

In the illustrated embodiment, the coherent light source system 310 comprises a PDH servo system 310a, a CW slave optical source 310c, a master optical source 310b, a CCW slave optical source 310d, a CW resonance tracking servo 310g, a CW optical phase lock loop 310e, a CCW optical phase lock loop 310f, a CCW resonance tracking servo system 310h, and a optical combiner (combiner) 310i. The PDH servo system 310a is configured to receive a first feedback signal 305a, and is coupled to the master optical source 310b and the first photodetector 306a. The CW resonance tracking servo 310g is configured to receive the third feedback signal 305c, and is coupled to the CW optical phase lock loop 310e and the third photodetector 306c. The CW optical phase lock loop 310e is coupled to the CW slave optical source 310c and the master optical source 310b. The CCW resonance tracking servo system 310h is configured to receive the second feedback signal 305b, and is coupled to the CCW optical phase lock loop 310f and the second photodetector 306b. The CCW optical phase lock loop 310f is coupled to the CCW slave optical source 310d and the master optical source 310b.

The optical combiner 310i combines a first optical signal 311a emitted from the CW slave optical source 310c and a second optical signal 311b emitted from the master optical source 310b, and forms the CW optical signal 303a. The CCW slave optical source 310d generates the CCW optical signal 303b.

The first feedback signal 305a and the PDH servo system 310a lock the carrier frequency of the second optical signal 311b emitted by the master optical source 310b to a longitudinal resonant frequency or to a frequency that is offset from a longitudinal resonant frequency of the optical resonator by a fixed frequency (offset frequency). The longitudinal resonant frequency equals q multiplied by a free spectral range (FSR) of the optical resonator, where q is an integer. In some embodiments, the carrier frequency of the second optical signal 311b is locked to q times FSR, or in some embodiments it is locked to $(q+\frac{1}{2})*FSR$. The difference between the carrier frequency and the longitudinal resonant frequency of the resonator is the frequency offset. For the sake of convention, if the frequency offset is a non-zero fraction of an FSR, the offset frequency is the defined to be the frequency increment that the carrier is offset (greater than) from the closest lower resonant frequency of the optical resonator. The longitudinal resonant frequency is the longitudinal frequency of the resonance of the optical resonator. Longitudinal resonances are the series of resonances of the fundamental spatial mode of the resonator that occur every time an integer number of wavelengths of light fit inside the optical path length of the optical resonator.

The third feedback signal 305c and the CW resonance tracking servo system 310g and the CW optical phase lock loop 310e lock the carrier frequency of the first optical signal 311a emitted by the CW slave optical source 310c to a resonant frequency or to a frequency that is offset from a CW resonant frequency of the optical resonator by a fixed frequency. The CW resonant frequency equals p multiplied by a free spectral range (FSR) of the optical resonator, where p is an integer. In some embodiments, the carrier frequency of the first optical signal 311a is locked to p times FSR, or in some embodiments it is locked to $(p+\frac{1}{2})*FSR$.

The second feedback signal 305b, the CCW resonance tracking servo system 310h, and CCW phase lock loop 310f lock the carrier frequency of the CCW optical signal 303b emitted by the CCW slave optical source 310d to a resonant frequency or to a frequency that is offset from a CCW resonant frequency of the optical resonator by a fixed frequency. The CCW resonant frequency equals m multiplied by a free spectral range (FSR) of the optical resonator, where m is an integer. In some embodiments, the carrier frequency of the CCW optical signal 303b is locked to m times FSR, or in some embodiments it is locked to $(m+\frac{1}{2})*FSR$. In one embodiment, q, p, and m are different integer numbers.

When the CW and CCW carrier frequencies are both locked to offset frequencies, the frequency offsets from optical resonator resonant frequencies are substantially equal; hence, the difference between the carrier frequencies of the first optical signal 311a and the CCW optical signal 303b are equal to $\Delta f$ as described above, and rotation rate can be derived from $\Delta f$ as described above.

In one embodiment, the frequency offsets of the first optical signal 311a and the CCW optical signal 303b are substantially zero frequency. In another embodiment, each frequency offset is substantially one half of a free spectral range of the optical resonator. In all embodiments, the first optical signal 311a, the second optical signal 311b, and CCW optical signal 303b are frequency modulated, e.g. by frequency modulating respectively the CW slave optical source 310c, the master optical source 310b, and the CCW slave optical source 310d, to determine optical resonator resonant frequencies. In one embodiment, modulation frequencies for the CW slave optical source 310c, the master optical source 310b, and the CCW slave optical source 310d are all different, so that the CCW resonance tracking servo system 310h, the CW resonance tracking servo system 310g, and the PDH servo system 310a may distinguish detected optical signals from each of the CW slave optical source 310c, the master optical source 310b, and the CCW slave optical source 310d. The frequency modulation causes each of the first optical signal 311a, the second optical signal 311b, and the CCW optical signal 303b to have a spectrum of frequencies centered about a corresponding carrier frequency.

In embodiments where the carrier frequencies of the first optical signal 311a and the CCW optical signal 303b, respectively emitted by the CW slave optical source 310c and the CCW slave optical source 310d, are locked to a frequency offset of substantially one half free spectral range from a resonant frequency of the optical resonator in the CW and CCW directions respectively, the odd sidebands of the CW slave optical source 310c and the CCW slave optical source 310d are locked onto resonant frequencies in the CW and CCW directions respectively. This condition is substantially the same for measuring rotation rate as the case of locking CW and CCW slave optical source carrier frequencies to CW and CCW resonant frequencies of the optical resonator.

In one embodiment, the carrier frequencies of first optical signal 311a, the second optical signal 311b, and the CCW optical signal 303b are controlled as follows. The carrier frequency of the first optical signal 311a is locked to a resonant frequency or an offset frequency (from resonant frequency) corresponding to the CW direction of the optical resonator as shown in FIG. 2. The photodetector PD1 306a detects an incident optical signal, and generates the corresponding first feedback 305a which is provided to the PDH servo system 310a. The PDH servo system 310a is responsive to a frequency component in first feedback signal 305a that is related to the frequency of modulation applied to the carrier frequency of the master optical source 310b. Portions of the second optical signal 311b, emitted by the master optical source 310b, are respectively coupled to the CW optical phase lock loop 310e and the CCW optical phase lock loop 310f. A portion of the first optical signal 311a, emitted by the CW slave optical source 310c, and a portion of the CCW optical signal 303b, emitted by the CCW slave optical source 310d, are respectively coupled to the CW phase lock loop 310e and the CCW phase lock loop 310f. The carrier frequency of the first optical signal 311a is locked to the carrier frequency of the second optical signal 311b within a tunable difference frequency of $f_1$ by the CW optical phase lock loop 310e. The carrier frequency of the CCW optical signal is locked to the master carrier frequency within a tunable difference frequency of $f_2$ by the CCW optical phase lock loop 310f. A tunable difference frequency is a frequency within the tuning range of the corresponding servo system. The frequency of the carrier of the master optical source 310b is locked to a resonant frequency of the resonator (or a fixed offset from the resonant frequency, e.g., substantially one half free spectral range). The CW resonance tracking servo system 310g and the CCW resonance tracking servo system 310h control tunable difference frequencies $f_1$ and $f_2$ so that the carrier frequency of the first optical signal is locked to the CW resonance of the optical resonator (or at a frequency offset of substantially one half free spectral range from it) and the carrier frequency of the CCW optical signal is locked to the CCW resonance of the resonator (or to a frequency offset of substantially one half free spectral range from it). The tunable difference frequencies $f_1$ and $f_2$ are controlled such that the desirable offset of the CW and CCW carrier frequencies from resonance (e.g., substantially zero or substantially one half free spectral range) are maintained during rotation rate changes, and changing environmental conditions, e.g. temperature and vibrations, that can cause the optical resonator resonances to shift over time.

As shown in FIG. 2, the first optical signal 311a emitted from the CW slave optical source 310c and the second optical signal 311b emitted from the master optical source 310b are combined in optical combiner 310i prior to being coupled to the optical processing system 304. Optical combiner 310i may be a bulk optic beam splitter, or a fiber optical direction coupler, or another waveguide directional optical coupler.

In one embodiment, the master optical source 310b, the CW optical source 310c and the CCW optical source 310d each respectively comprise a LASER. Each optical source may include two or more optical outputs provided, e.g., to the optical resonator and optical phase lock loop(s) and implemented with an optical splitter. One or more optical sources may include a phase modulator to frequency modulate respective LASER(s). One or more optical sources may include intensity (or amplitude) modulators to compensate for phase modulation to amplitude modulation noise in phase modulator(s), to equalize the amplitude levels of the baseband component emitted by the slave optical sources, and to stabilize the second optical signal 311b emitted by the master optical source 310b. Each optical source may include optical isolators to prevent leakage of undesired signal into such sources. In another embodiment, the PDH servo system 310a, the CW resonance tracking servo system 310g, and the CCW resonance tracking servo system 310h are respectively implemented with electronic circuitry.

As discussed above, each optical source can emit optical signals with two different polarizations. It is desirable to diminish the effect of the optical signal with the undesired polarization. Another benefit of antiresonant nodeless fiber is that it has lower surface scattering and optical backscatter.

Figure 4:
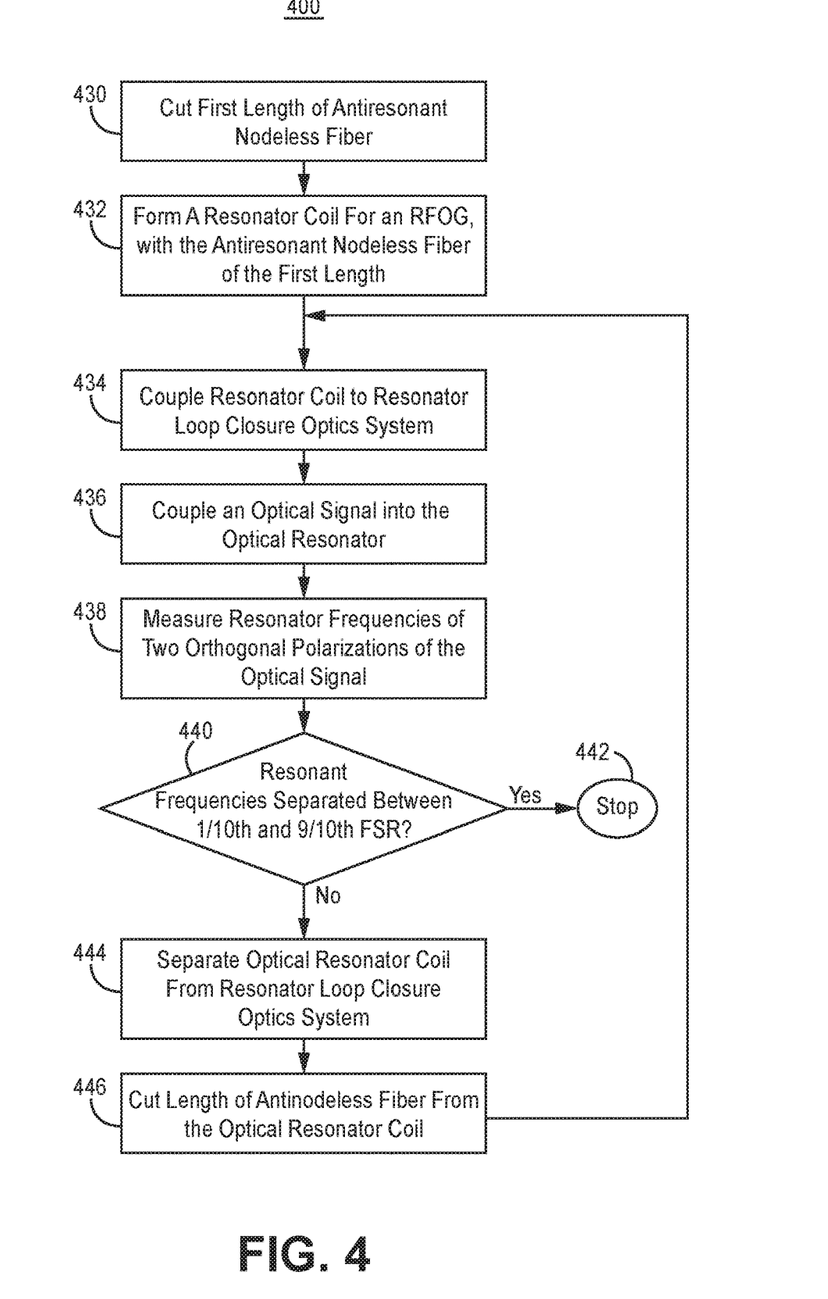
FIG. 4 illustrates one embodiment of a method of manufacturing an optical resonator.

FIG. 4 illustrates one embodiment of a method of manufacturing an optical resonator 400. In block 430, cut a first length of antiresonant nodeless fiber, e.g. from a spool. For example, the first length may be one hundred meters. In block 432, form a resonator coil for a gyroscope, e.g. an RFOG, with the antiresonant nodeless fiber of the first length.

In block 434, couple the resonator coil to a resonator loop closure optics system. The resonator loop closure optics system and the optical resonator coil form an optical resonator. Optionally, the resonator loop closure optics system used for this method is the resonator loop closure optics system to be incorporated with the resonator coil into the gyroscope; alternatively the resonator loop closure optics system is a text fixture that is the same or substantially similar to the resonator loop closure optics system to be incorporated with the resonator coil into gyroscope.

In block 436, couple an optical signal into, e.g. an input port of, the optical resonator so that the first optical signal circulates in one direction around the optical resonator. In block 438, measure, e.g. at an output port of the optical resonator, resonance frequencies of the optical resonator at two, orthogonal polarizations. In block 440, determine if the resonant frequencies are separated between one tenth of a free spectral range and nine tenths of a free spectral range (e.g. between one quarter of a free spectral range and three quarters of a free spectral range or by one half of a free spectral range).

If yes, then in block 442 stop; at this block, the length of the antiresonant nodeless fiber of the optical resonator coil shall be deemed the final length. The final length may equal the first length or a length shorter than the first length. Optionally, in block 442, insert the optical resonator into a gyroscope.

If no, then in block 444 separate the optical resonator coil from the resonator loop closure optics. In block 446, cut a length, e.g. between one to fifty centimeters, of the antiresonant nodeless fiber from the optical resonator coil. Then return to block 434.

If the characteristics of the antiresonant nodeless fiber is repeatable throughout the spool, optical resonator coils may be formed from antiresonant nodeless fiber (from the same spool) having the same final length for use in gyroscopes utilizing the same resonator loop closure optics system. If the characteristics of the antiresonant fiber is repeatable from spool to spool, optical resonator coils may be formed from antiresonant nodeless fiber (from different spools) having the same final length for use in gyroscopes utilizing the same resonator loop closure optics system.

EXEMPLARY EMBODIMENTS

An optical resonator, comprising: an optical resonator coil comprising a first port and a second port; wherein the optical resonator coil comprises antiresonant nodeless fiber; a resonator loop closure optics system; and wherein the antiresonant nodeless fiber has a length such that the resonant frequencies the optical resonator of the desired polarization state of light and of the undesired polarization state of light are separated by between a tenth of a free spectral range and nine tenths of a free spectral range to minimize gyroscope errors.

Example 2 includes the optical resonator of Example 1, wherein the resonant frequencies the optical resonator of the desired polarization state of light and of the undesired polarization state of light are separated by at least one of (a) between a one quarter of a free spectral range and three quarters of a free spectral range, and (b) one half of a free spectral range.

Example 3 includes the optical resonator of any of Examples 1-2, wherein the antiresonant nodeless fiber comprises at least one of antiresonant nodeless fiber which is nested and antiresonant nodeless fiber which is not nested.

Example 4 includes the optical resonator of Example 3, wherein the antiresonant nodeless fiber comprises tubes, and wherein each tube has a cross section that is circular or elliptical.

Example 5 includes the optical resonator of Example 4, wherein each tube comprises glass.

Example 6 includes the optical resonator of any of Examples 4-5, wherein each tube is filled with a gas or a vacuum.

Example 7 includes the optical resonator of Example 1, wherein the optical resonator is configured for use in a gyroscope.

Example 8 includes a gyroscope, comprising: an optical resonator coil having a first port and a second port; wherein the optical resonator coil comprises antiresonant nodeless fiber; a first photodetector; a second photodetector; a third photodetector; a coherent light source system coupled to the first photodetector, the second photodetector, and the third photodetector, and configured to generate a first optical signal and a second optical signal; a processing system, coupled to the coherent light source system, configured to determine angular rotation of an optical resonator; and an optical processing system, comprising a loop closure optics system, coupled to the first port, the second port, the first photodetector, the second photodetector, the third photodetector, and configured to receive the first optical signal and the second optical signal; wherein the optical resonator coil is coupled to the loop closure optics system; wherein the optical resonator comprises the optical resonator coil and the loop closure optics system; and wherein the antiresonant nodeless fiber has a length such that the resonant frequencies the optical resonator of the desired polarization state of light and of the undesired polarization state of light are separated by between a tenth of a free spectral range and nine tenths of a free spectral range to minimize gyroscope errors.

Example 9 includes the gyroscope of Example 8, wherein the resonant frequencies the optical resonator of the desired polarization state of light and of the undesired polarization state of light are separated by at least one of (a) between a one quarter of a free spectral range and three quarters of a free spectral range, and (b) one half of a free spectral range.

Example 10 includes the gyroscope of any of Examples 8-9, wherein the antiresonant nodeless fiber comprises at least one of antiresonant nodeless fiber which is nested and antiresonant nodeless fiber which is not nested.

Example 11 includes the gyroscope of any of Examples 9-10, wherein the antiresonant nodeless fiber comprises tubes, and wherein each tube has a cross section that is circular or elliptical.

Example 12 includes the gyroscope of Example 11, wherein the tubes comprise glass; and wherein each tube is filled with a gas or a vacuum.

Example 13 includes a method, comprising: cutting a first length of antiresonant nodeless fiber; forming a resonator coil with the antiresonant nodeless fiber of the first length; coupling the resonator coil to a resonator loop closure optics system to form an optical resonator; coupling an optical signal into the optical resonator so that the first optical signal circulates in one direction around the optical resonator; measuring resonance frequencies of the optical resonator at two, orthogonal polarizations; determining if the resonant frequencies are separated by between one tenth of a free spectral range and nine tenths of a free spectral range; if the resonant frequencies are not separated by between one tenth of a free spectral range and nine tenths of a free spectral range, then separating the optical resonator coil from the resonator loop closure optics; and cutting a length of the antiresonant nodeless fiber from the optical resonator coil.

Example 14 includes the method of Example 13, wherein cutting a first length comprises cutting a first length equal to one hundred meters.

Example 15 includes the method of any of Examples 13-14, further comprising inserting the optical resonator into a gyroscope.

Example 16 includes the method of any of Examples 13-15, wherein determining if the resonant frequencies are separated comprises determining whether the resonant frequencies are separated by at least one of (a) between one quarter of a free spectral range and three quarters of a free spectral range, and (b) one half of a free spectral range.

Example 17 includes the method of any of Examples 13-16, wherein cutting the length of the antiresonant nodeless fiber from the optical resonator coil comprises cutting between one and fifty centimeters of the antiresonant nodeless fiber.

Example 18 includes the method of any of Examples 13-17, wherein cutting the first length of antiresonant nodeless fiber comprises cutting the first length of antiresonant nodeless fiber comprising cutting a first length of at least one of antiresonant nodeless fiber which is nested and antiresonant nodeless fiber which is not nested.

Example 19 includes the method of any of Examples 13-18, wherein cutting the first length of antiresonant nodeless fiber comprises cutting a first length of antiresonant nodeless fiber comprising tubes, and wherein each tube has a cross section that is circular or elliptical.

Example 20 includes the method of Example 19, wherein cutting the first length of antiresonant nodeless fiber comprising tubes comprises cutting a first length of antiresonant nodeless fiber tubes comprised of glass, wherein each tube is filled with a gas or a vacuum.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical resonator, comprising:
an optical resonator coil comprising a first port and a second port;
wherein the optical resonator coil comprises antiresonant nodeless fiber;
a resonator loop closure optics system; and
wherein the antiresonant nodeless fiber has a length such that the resonant frequencies of the optical resonator of a desired polarization state of light and of an undesired polarization state of light are separated by between a tenth of a free spectral range and nine tenths of a free spectral range to minimize gyroscope errors.

2. The optical resonator of claim 1, wherein the resonant frequencies of the optical resonator of the desired polarization state of light and of the undesired polarization state of light are separated by at least one of (a) between a one quarter of a free spectral range and three quarters of a free spectral range, and (b) one half of a free spectral range.

3. The optical resonator of claim 1, wherein the antiresonant nodeless fiber comprises at least one of antiresonant nodeless fiber which is nested and antiresonant nodeless fiber which is not nested.

4. The optical resonator of claim 3, wherein the antiresonant nodeless fiber comprises tubes, and
wherein each tube has a cross section that is circular or elliptical.

5. The optical resonator of claim 4, wherein each tube comprises glass.

6. The optical resonator of claim 4, wherein each tube is filled with a gas or a vacuum.

7. The optical resonator of claim 1, wherein the optical resonator is configured for use in a gyroscope.

8. A gyroscope, comprising:
an optical resonator coil having a first port and a second port;
wherein the optical resonator coil comprises antiresonant nodeless fiber;
a first photodetector;
a second photodetector;
a third photodetector;
a coherent light source system coupled to the first photodetector, the second photodetector, and the third photodetector, and configured to generate a first optical signal and a second optical signal;
a processing system, coupled to the coherent light source system, configured to determine angular rotation of an optical resonator; and
an optical processing system, comprising a loop closure optics system, coupled to the first port, the second port, the first photodetector, the second photodetector, the third photodetector, and configured to receive the first optical signal and the second optical signal;
wherein the optical resonator coil is coupled to the loop closure optics system;
wherein the optical resonator comprises the optical resonator coil and the loop closure optics system; and
wherein the antiresonant nodeless fiber has a length such that the resonant frequencies of the optical resonator of a desired polarization state of light and of an undesired polarization state of light are separated by between a tenth of a free spectral range and nine tenths of a free spectral range to minimize gyroscope errors.

9. The gyroscope of claim 8, wherein the resonant frequencies of the optical resonator of the desired polarization state of light and of the undesired polarization state of light are separated by at least one of (a) between a one quarter of a free spectral range and three quarters of a free spectral range, and (b) one half of a free spectral range.

10. The gyroscope of claim 8, wherein the antiresonant nodeless fiber comprises at least one of antiresonant nodeless fiber which is nested and antiresonant nodeless fiber which is not nested.

11. The gyroscope of claim 9, wherein the antiresonant nodeless fiber comprises tubes, and
wherein each tube has a cross section that is circular or elliptical.

12. The gyroscope of claim 11, wherein the tubes comprise glass; and
wherein each tube is filled with a gas or a vacuum.

13. A method, comprising:
cutting a first length of antiresonant nodeless fiber;
forming a resonator coil with the antiresonant nodeless fiber of the first length;
coupling the resonator coil to a resonator loop closure optics system to form an optical resonator;
coupling an optical signal into the optical resonator so that the first optical signal circulates in one direction around the optical resonator;
measuring resonance frequencies of the optical resonator at two, orthogonal polarizations;
determining if the resonant frequencies are separated by between one tenth of a free spectral range and nine tenths of a free spectral range;
if the resonant frequencies are not separated by between one tenth of a free spectral range and nine tenths of a free spectral range, then separating the optical resonator coil from the resonator loop closure optics; and
cutting a length of the antiresonant nodeless fiber from the optical resonator coil.

14. The method of claim 13, wherein cutting a first length comprises cutting a first length equal to one hundred meters.

15. The method of claim 13, further comprising inserting the optical resonator into a gyroscope.

16. The method of claim 13, wherein determining if the resonant frequencies are separated comprises determining whether the resonant frequencies are separated by at least one of (a) between one quarter of a free spectral range and three quarters of a free spectral range, and (b) one half of a free spectral range.

17. The method of claim 13, wherein cutting the length of the antiresonant nodeless fiber from the optical resonator coil comprises cutting between one and fifty centimeters of the antiresonant nodeless fiber.

18. The method of claim 13, wherein cutting the first length of antiresonant nodeless fiber comprises cutting the first length of antiresonant nodeless fiber comprising cutting a first length of at least one of antiresonant nodeless fiber which is nested and antiresonant nodeless fiber which is not nested.

19. The method of claim 13, wherein cutting the first length of antiresonant nodeless fiber comprises cutting a first length of antiresonant nodeless fiber comprising tubes, and wherein each tube has a cross section that is circular or elliptical.

20. The method of claim 19, wherein cutting the first length of antiresonant nodeless fiber comprising tubes comprises cutting a first length of antiresonant nodeless fiber tubes comprised of glass, wherein each tube is filled with a gas or a vacuum.

\* \* \* \* \*